United States Patent [19]

Mossi et al.

[11] Patent Number: 5,622,381
[45] Date of Patent: Apr. 22, 1997

[54] INTEGRAL PROJECTILE SQUIB FOR AIR BAG INFLATORS

[75] Inventors: G. Dean Mossi, Roy; Mark B. Woodbury, North Salt Lake; Alan D. Kendrick, Hooper, all of Utah

[73] Assignee: Morton International, Inc., Chicago, Ill.

[21] Appl. No.: 660,646

[22] Filed: Jun. 7, 1996

[51] Int. Cl.⁶ ................................. B60R 21/26
[52] U.S. Cl. .................. 280/737; 280/736; 222/5; 222/83; 102/202
[58] Field of Search ................... 280/737, 741, 280/736, 742; 222/3, 5, 83, 81; 102/530, 531, 202, 202.14; 422/165, 166

[56] References Cited

U.S. PATENT DOCUMENTS

| | | | |
|---|---|---|---|
| 3,648,898 | 3/1972 | Day | 222/5 |
| 3,723,205 | 3/1973 | Scheffee | 280/737 |
| 3,774,807 | 11/1973 | Keathley et al. | 222/3 |
| 5,131,680 | 7/1992 | Coultas et al. | 280/737 |
| 5,257,819 | 11/1993 | Frantem et al. | 280/737 |
| 5,460,406 | 10/1995 | Faigle | 280/741 |

FOREIGN PATENT DOCUMENTS 2211355  1/1972  Germany ............. 280/737

*Primary Examiner*—Christopher P. Ellis
*Attorney, Agent, or Firm*—Gerald K. White

[57] ABSTRACT

Integrally incorporated in a squib is a locking feature that allows a projectile to be attached to it any time between assembly of the squib and installation of the squib into the inflator. This design enhances the safety of the squib by permitting handling without the projectile attached. It also minimizes the number of parts required to perform the function of rupturing a burst disk in an inflator by combining the function of the projectile with the protective covering of the squib body.

12 Claims, 2 Drawing Sheets

INTEGRAL PROJECTILE SQUID FOR AIR BAG INFLATORS

BACKGROUND OF THE INVENTION

1. Field of the Invention

The present invention relates to squibs or initiators and pyrotechnic ignition devices that are required to launch a projectile.

2. Description of the Related Art

Protective passive restraint or air bags used in automotive vehicles, escape slide chutes, life rafts and the like, are normally stored deflated and are inflated with gas at the time of need. Generally such devices are stored and used in close proximity to human beings. The devices, therefore, must be designed with a high safety factor that is effective at all times, during assembly as well as when stored and used.

Inflation is generally accomplished by means of an inert gas that is stored in a container under suitably high pressure. The gas may be further pressurized and supplemented at the time of use by the addition of high temperature combustion gas products that are produced by the burning of a gas generating composition.

Inflator assemblies for inflating an automotive vehicle occupant restraint or air bag are disclosed in U.S. Pat. Nos. 3,723,205, 3,714,807 and 5,131,680. The inflator assembly of U.S. Pat. No. 3,723,205 includes a container containing a gas under pressure. When there is need for an air bag or other inflatable device to be inflated, a squib is electrically actuated to ignite a gas generating composition. Burning of the gas generating composition causes an increase in the pressure in the container. This pressure increase is due to the gaseous products and heat provided by the burning of the composition. A rupturable burst disk is ruptured when a predetermined pressure is reached. The rupture of the burst disk enables gas to flow from the container to the air bag.

The inflator assemblies of U.S. Pat. Nos. 3,774,807 and 5,131,680 also include a container in which gas is stored under pressure. A gas generating valve releases the stored gas from the container and releases a supplementary gas into the stored gas from a gas generator after the stored gas has been released. This is accomplished by sending an electrical current through a squib. Such initiation of the squib results in an explosion that propels a projectile, specifically in U.S. Pat. No. 3,774,807 by a third member comprising a piston, and in U.S. Pat. No. 5,131,680 by a third member comprising an actuator assembly. In each case this propulsion opens an outlet port on the container which releases the stored gas. Supplementary gas from a gas generator is then released into the stored gas in the container, again by the propulsion of the respectively associated piston and actuator assembly.

The squib inflation systems of U.S. Pat. Nos. 3,714,807 and 5,131,680 differ from that of U.S. Pat. No. 3,723,205 by calling for the use of a movable piston or movable actuating member, specifically a projectile. The squibs used in the inflation systems of U.S. Pat. Nos. 3,714,807 and 5,131,680, and in such systems otherwise known in the prior art, do not use an integral projectile. Rather, they typically employ a separate projectile that is mechanically fastened to a third member to which the squib is also fastened. This, however, involves, for such squibs, a considerable extra expense for their production.

There is, thus, a need and a demand for an integral projectile squib which does not require a third member for attachment, and in addition, which is characterized in that the projectile may be attached to the squib body at almost any point in time prior to installation of the squib into the inflator, for example, of an automotive vehicle occupant restraint system. This feature makes transport and handling of the squib without the projectile attached much easier. The projectile also serves as a protective covering for the squib once it is installed.

SUMMARY OF THE INVENTION

It is an object of the invention to provide an integral projectile squib for air bag inflators.

Another object of the invention is to provide a projectile that is mechanically fastened to a squib and which does not require a third member for attachment.

Still another object of the invention is to provide an integral projectile squib that is characterized by the ease with which the projectile is attached to the squib body.

A further object of the invention is to provide a snap-on method of attachment of a projectile to a squib which also permits adequate retention of the projectile under all severe drop and vibration environments while allowing the projectile to break free when the squib is activated.

A further object of the invention is to provide an integral projectile squib for an air bag inflator in which the projectile does not have to be installed until immediately prior to installing the squib in the inflator thereby to avoid a safety hazard that would exist if the projectile were to be installed at the time of squib manufacture because if the squib were accidentally to be initiated, it would launch the projectile with great force, causing a potential for bodily harm to a human being.

Still another object of the invention is to provide an integral projectile squib for air bag inflators comprising a squib comprising a body having a first end and a second end with electrical energizing terminals extending from the first end and a first tubular portion at the second end, the squib body having a second tubular portion adjacent the first tubular portion, both of the tubular portions being axially aligned, with the second tubular portion having a larger circumference than the first tubular portion, a locking ring rigidly attached in encircling relation to the circumference of the first tubular portion of said squib at a position that is closer to said second tubular portion than to the second end of said squib, a caplike cover having an inner wall with an open end and a closed end that is attachable to the squib to cover the first tubular portion and a portion of the second tubular portion, the cover having a collar-like vessel edge at the open end that is sized to snugly cover a portion of the second tubular portion when the cover is attached to the squib, the cover having a locking feature on the inner wall that cooperates with the locking ring on the first tubular portion to retain the cover attached to the squib when forced in attached relation thereto until the squib is initiated by the application of an electrical signal to the terminals to cause an explosion and the production of a gas that ruptures the first tubular portion of the squib to force the caplike cover off the squib and launch the caplike cover as a projectile.

The best known embodiment of the invention to achieve these and other known objectives of the invention constitute a squib that incorporates a snap-on, locking feature such that a projectile can be easily attached. This type of squib would most appropriately be used in an inflator assembly that required a burst disk to be ruptured in order to effect the release of a high pressure, stored gas from a container. The projectile would be attached prior to assembly of the squib into the inflator assembly. At the time of actuation of the squib, the expanding gas from the squib forces the projectile to overcome the locking force of the snap-on feature and propels the projectile in the desired direction.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, and of which.

DESCRIPTION OF THE PREFERRED EMBODIMENT

Figure 1:
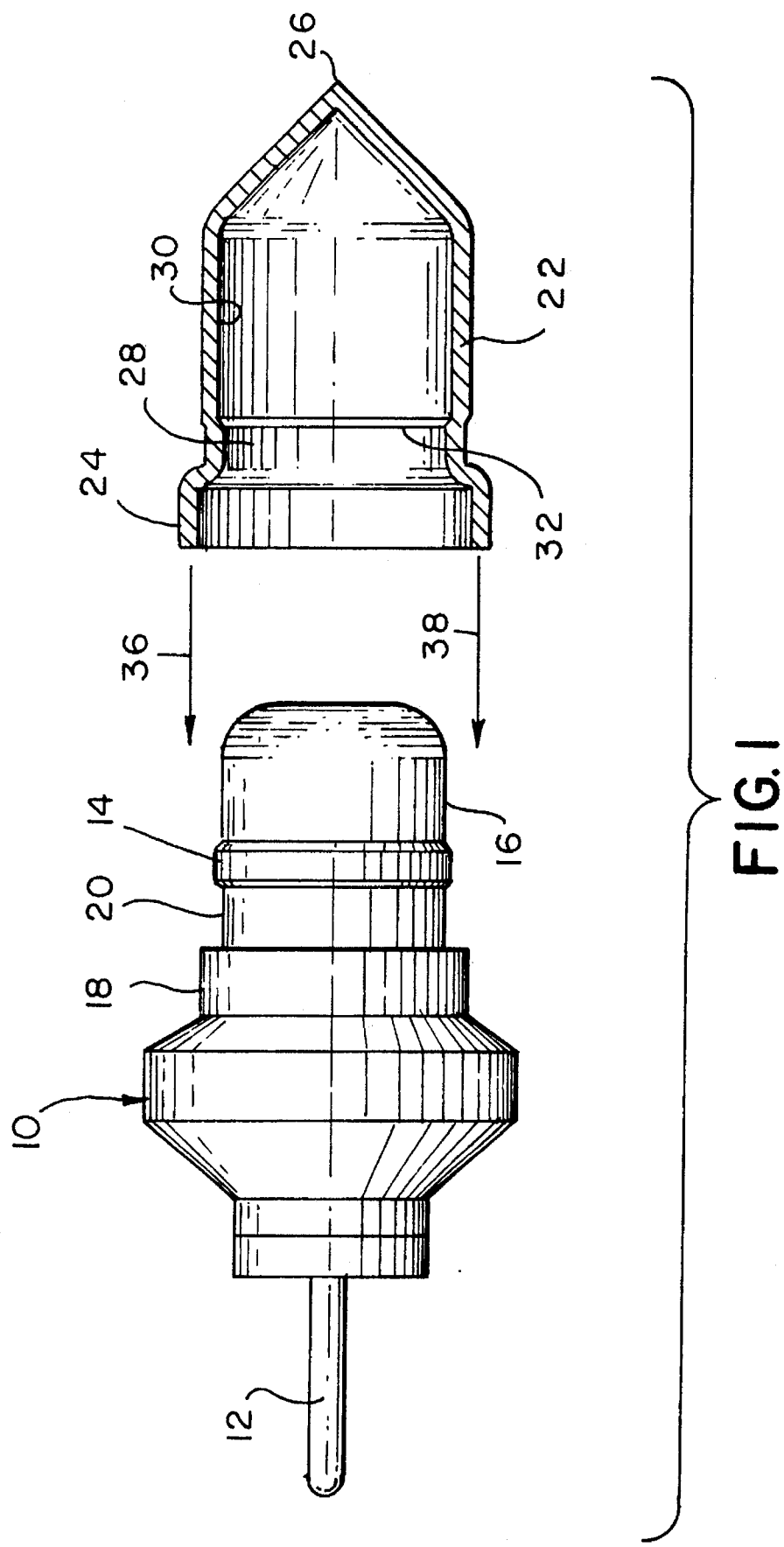
FIG. 1 is a side view of a squib that incorporates a snap-on locking ring feature such that a caplike cover, shown in section, can be attached thereto.

Referring to the drawings, there is illustrated in FIG. 1 a squib 10 which substantially comprises a conventional initiator or electric squib having a pair of electrical energizing terminals 12 of which one only is shown, that are adapted for plug-in connection to external vehicle crash sensor means (not shown). The squib 10 differs from conventional squibs only in the provision thereon of a protuberant locking ring 14. The locking ring 14 encircles the perimeter of a first tubular portion 16 of the body of the squib 10 that ruptures upon initiation of the squib 10 and is remote from the terminals 12. Initiation of the squib 10 is effected by the application of an electric signal to the terminals 12 by the aforementioned vehicle crash sensor means. The radially extending locking ring 14 on the squib 10 forms an axially protruding edge. Spaced from the locking ring 14 on the tubular portion 16 of the squib 10 toward the terminals 12 is a second axially protruding portion 18 of the squib 10 the diameter of which second portion is greater than that of the locking ring 14 and the first portion 16. As shown, the width of the protruding portion 18 and the space, designated 20, from the locking ring 14 are both about twice the width of the locking ring 14.

A projectile 22, as shown in FIG. 1, for the squib 10 is formed as a relatively thin walled drawn caplike tubular cover having an open end and a closed end and made from a suitable resilient, hard and strong material. At the open end a collar-like enlarged vessel edge 24 is formed on the projectile 22. The closed end of the projectile 22 is arched to a point 26. The width and inner diameter of the vessel edge 24 of the projectile 22 are sized so as to fit snugly over the protruding portion 18 of the squib 10 for substantially the entire width thereof when the projectile 22 is placed in covering relation to the tubular portion 16 of the squib 10. Immediately inwardly of the vessel edge 24 of the projectile 22, the diameter of an inner wall or internal portion 28 is conically reduced for an appropriate distance to fit snugly over the space 20 on the tubular portion 16 of the squib 10 when the projectile 22 is directly attached thereto. Further inwardly of the projectile 22 the internal diameter of a portion 30 of the projectile 22 is increased to the diameter of the locking ring 14 on the squib 10. This forms, as shown in FIG. 1, a locking feature 32.

Figure 2:
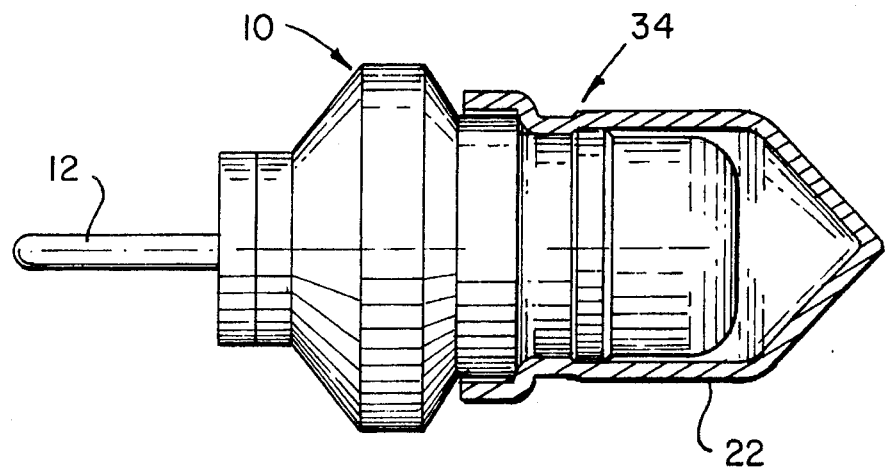
FIG. 2 is a side view of the integral projectile squib, according to the invention, showing the squib of FIG. 1 with the caplike cover, shown in section, attached thereto and retained thereon by the snap-on locking ring feature.

In accordance with the invention the projectile 22 is directly attached to the squib 10, as shown in FIG. 2, forming an integral projectile squib 34. Movement of the projectile 22 in the direction indicated by the arrows 36 and 38 in FIG. 1 brings the edge 24 in covering relation to the locking ring 14 and the conically reduced internal portion 28 into engagement with the adjacent edge of the locking ring 14. Forcing the projectile 22 against the squib 10 causes the internal portion 28 to slip over the locking ring 14 and snap into place with the edge 24 and internal portion 28 in adjacent covering relation to the portion 18 and the space 20, respectively, on the squib 10, and the locking feature 32 in snapped-on locking position against the edge of the locking ring 14 that is adjacent the space 20.

Figure 3:
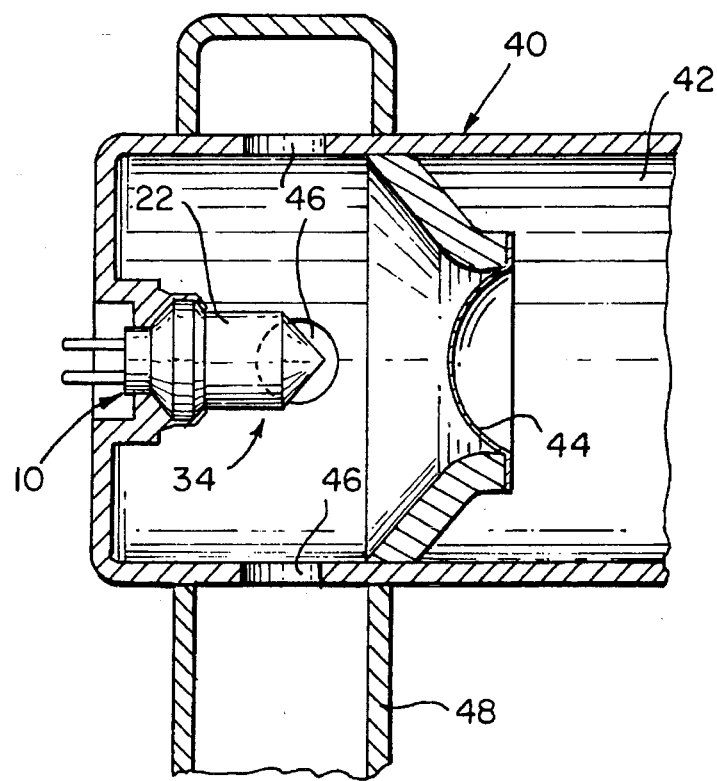
FIG. 3 is a view of the integral projectile squib of FIG. 2 attached into a fragmentarily illustrated inflator assembly having a longitudinal axis that requires a burst disk to be ruptured in order to effect the release of a high pressure stored gas.

FIG. 3 shows schematically an inflation system utilizing the integral projectile squib improvement of the present invention. An inflator body 40, which is fragmentarily illustrated, defines a generally cylindrical chamber 42. The chamber 42 is filled with an inert gas such as argon under pressure. An actuator assembly for the inflator system consists of an integral projectile squib 34, according to the invention, comprising a squib 10 and an attached projectile 22. Between the integral projectile squib 34 and the cylindrical chamber 42 containing the pressurized gas is a burst disk 44 which seals the chamber 42.

The projectile 22 is attached to the squib 10 prior to assembly of the integral projectile squib 34 into the inflator body 40. At the time of actuation of the squib 10, the expanding gas from the squib 10 forces the projectile 22 to overcome the locking force of the snap-on locking feature 32. This results in the projectile 22 being propelled in the desired direction to rupture the burst disk 44.

In the wall of the portion of the inflator body 40 that is sealed from the chamber 40 by the burst disk 44 and which contains the integral projectile squib 34, there are provided four ports 46. An outlet conduit 48 sealed at one end encloses ports 46. The outlet conduit 48 is in communication with an air bag (not shown) that is to be inflated.

Upon the rupture of the burst disk 44, the stored gas under pressure in the chamber 42 immediately flows out of the ports 46 into the outlet conduit 48 and through the latter into an air bag (not shown) to be inflated.

Thus, in accordance with the invention, there has been provided an integral projectile squib for air bag inflators.

There are unique aspects of this invention that distinguish it from squib/initiation systems of the prior art that call for the use of a projectile. First, the prior art squibs and initiators do not use an integral projectile. They employ a separate projectile that is mechanically fastened to a third member to which the squib is also fastened. This invention does not require a third member for attachment, thus simplifying and reducing the cost of construction. The snap-on method of attachment of the projectile 22 to the squib 10 utilized according to the invention permits adequate retention of the projectile 22 under all severe drop and vibration environments while allowing the projectile 22 to break free when the squib 10 is activated.

The novelty of the invention is distinguished by the ease with which the projectile 22 is attached to the body of the squib 10. A simple snap-on feature is provided for so that the projectile 22 may be attached to the body of the squib 10 at almost any point in time prior to installation of the integrated projectile squib 34 into the inflator. The advantage of this feature is that the projectile 22 does not have to be installed until immediately prior to installing the squib 10 into the air bag inflator. A safety hazard would exist if the projectile 22 were to be installed at the time of squib manufacture. This feature makes transport and handling of the squib 10 without the projectile 22 attached much easier. By making provision to attach the projectile 22 to the squib 10 just prior to installation in the inflator, the safety hazard is practically eliminated.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. An integral projectile squib for an air bag inflator comprising, a squib comprising a body having a first end and a second end with electrical energizing terminals extending from said first end and a first tubular portion at said second end, said body having a second tubular portion adjacent said first tubular portion, said tubular portions being axially aligned, with said second tubular portion having a larger circumference than said first tubular portion, a locking ring rigidly attached in encircling relation to the circumference of said first tubular portion of said squib at a position that is closer to said second tubular portion than to the second end of the body of said squib, a caplike cover having an inner wall with an open end and a closed end, said caplike cover being attachable to said squib to cover said first tubular portion and a portion of said second tubular portion and having a collar-like vessel edge at the open end that is sized to snugly cover a portion of said second tubular portion when said caplike cover is positioned in attached relation to said squib, said caplike cover having a locking feature on said inner wall that cooperates with said locking ring on said first tubular portion to retain said caplike cover in locked attachment to said squib until said squib is initiated by the application of an electrical signal to said terminals to cause an explosion and the production of a gas that ruptures said first tubular portion of said squib to force said caplike cover off said squib and launch said caplike cover as a projectile.

2. An integral projectile squib for an air bag inflator as defined in claim 1 wherein the closed end of the caplike cover of said squib is arched to a point.

3. An integral projectile squib for an air bag inflator as defined in claim 2 wherein said inflator comprises a container containing a stored pressurized inert gas and a rupturable disk seals the gas in said container, with said integral projectile squib positioned therein in a location separate from said stored gas and operable when initiated to launch said caplike cover as a projectile against said disk to rupture the latter thereby to effect the release of said stored gas from said container.

4. An integral projectile squib for an air bag inflator as defined in claim 1, wherein, inward of said vessel edge of said caplike cover the diameter of said inward wall is conically reduced for an appropriate distance to fit snugly over the space between said locking ring and said second tubular portion of said squib when said cover is fastened to said squib, and wherein, further inwardly of said inner wall of said cover the internal diameter of said cover is abruptly increased to the outer diameter of said locking ring, thereby forming a locking feature, whereby, when attaching said cover to said squib and the first portion of said squib is inserted into engagement with the inner wall of said cover, force is required to move the conically reduced diameter portion of said inner wall over said locking ring, and in the attached position said locking feature on said inner wall of said cover snaps into place over said locking ring and is trapped in locked relationship with said locking ring in that position.

5. An integral projectile squib for an air bag inflator as defined by claim 4, wherein still further inwardly of said cover said inner wall is closed and at that location said cover is arched to a point.

6. An integral projectile squib for an air bag inflator as defined by claim 4, wherein said cover is relatively thin walled and is sufficiently resilient to allow forcible attachment thereof to said squib in the manner described and also launching therefrom without rupture upon initiation of said squib.

7. An integral projectile squib for an air bag inflator comprising, a squib comprising a body having a first end and a second end with electrical energizing terminals extending from said first end and axially aligned first and second tubular body portions with the circumference of the first body portion being less than that of said second portion and positioned at said second end of said body, a locking ring attached in encircling relation to the circumference of said first tubular portion of said squib at a position that is substantially closer to said second tubular portion than to the second end of the body of said squib, and a caplike cover having an open end and a closed end and attachable at said open end to said squib to cover in protective relation said first tubular portion and a portion of said second tubular portion, said caplike cover having a collar-like vessel edge at the open end that is sized to snugly cover a portion of said second tubular portion when said caplike cover is attached to said squib, said caplike cover having a locking feature on said inner wall that cooperates with said locking ring on said first tubular portion to retain said caplike cover attached to said squib when forced in attached relation thereto, which attached relation provides protection for said squib until said squib is initiated and at that time launches said caplike cover as a projectile.

8. An integral projectile squib for an air bag inflator as defined in claim 7 wherein the closed end of said caplike cover is arched to a point.

9. An integral projectile squib for an air bag inflator as defined in claim 7 wherein upon initiation of said squib by the application of an electrical signal to said electrical energizing terminals said squib explodes and produces a gas that ruptures said first tubular portion of said squib and forces said caplike cover off said squib and launches said caplike cover as a projectile.

10. An integral projectile squib for an air bag inflator as defined in claim 9 wherein said inflator comprises a container containing a stored pressurized inert gas and a rupturable disk seals the gas in said container, and wherein said integral projectile squib is positioned therein at a location external to said stored gas and operates when initiated to launch said caplike cover as a projectile against said disk to rupture the latter thereby to effect the release of said stored gas from said container.

11. An air bag inflator comprising an inflator body having a chamber containing a stored pressurized inert gas, a gas outlet conduit in said inflator body, a rupturable disk that seals said inert gas in said chamber from said outlet conduit, an integral projectile squib in said inflator body at a location external to said stored gas in said chamber and positioned in cooperative relation with said rupturable disk, said integral projectile squib including a squib having a body with electrical energizing terminals and a locking ring thereon and a caplike cover having a locking feature on an inner wall thereof that in cooperation with said locking ring on said squib retains said caplike cover attached to said body of said squib when said caplike cover is forced thereon, said electrical projectile squib being operable when an electrical signal is applied to said terminals to explode and produce a gas that forces said caplike cover off the body of said squib and launches said caplike cover as a projectile against said rupturable disk to rupture said rupturable disk thereby to release said pressurized gas from said chamber to said outlet conduit.

12. An air bag inflator as defined in claim 11, wherein said inflator body includes a plurality of ports positioned in surrounding relation to said integral projectile squib, and wherein said plurality of ports are enclosed by said outlet conduit.

* * * * *

UNITED STATES PATENT AND TRADEMARK OFFICE
CERTIFICATE OF CORRECTION

PATENT NO. : 5,622,381
DATED : April 22, 1997
INVENTOR(S) : Mossi et al

It is certified that error appears in the above-indentified patent and that said Letters Patent is hereby corrected as shown below:

On the title page:Item [54] and Column 1, line 2

*"SQUID" should be "SQUIB".*

*Title page, under References cited, the date for document #3,723,205 should be "5/1991" instead of "3/1973".*

*Title page, under References cited, the inventor "Frantem" should be "Frantom".*

Signed and Sealed this

Nineteenth Day of August, 1997

*Attest:*

BRUCE LEHMAN

*Attesting Officer*  Commissioner of Patents and Trademarks